(12) United States Patent
Honjo

(10) Patent No.: US 12,509,333 B2
(45) Date of Patent: Dec. 30, 2025

(54) WINCH BRAKE DEVICE

(71) Applicant: SUMITOMO HEAVY INDUSTRIES CONSTRUCTION CRANES CO., LTD., Tokyo (JP)

(72) Inventor: Kohei Honjo, Aichi (JP)

(73) Assignee: SUMITOMO HEAVY INDUSTRIES CONSTRUCTION CRANES CO., LTD., Tokyo (JP)

( * ) Notice: Subject to any disclaimer, the term of this patent is extended or adjusted under 35 U.S.C. 154(b) by 929 days.

(21) Appl. No.: 17/575,034

(22) Filed: Jan. 13, 2022

(65) Prior Publication Data

US 2022/0219955 A1 Jul. 14, 2022

(30) Foreign Application Priority Data

Jan. 13, 2021 (JP) .................................. 2021-003628

(51) Int. Cl.
| | |
|---|---|
| B66D 5/26 | (2006.01) |
| B66D 5/22 | (2006.01) |
| F16D 65/18 | (2006.01) |
| F16D 121/06 | (2012.01) |

(52) U.S. Cl.
CPC .............. B66D 5/26 (2013.01); B66D 5/22 (2013.01); F16D 65/18 (2013.01); *F16D 2121/06* (2013.01)

(58) Field of Classification Search
CPC ...... B66D 2700/035; B66D 5/26; B66D 5/22; B66D 5/12; B66D 5/14; B66D 5/28; F16D 2121/06; F16D 65/18
See application file for complete search history.

(56) References Cited

U.S. PATENT DOCUMENTS

| | | |
|---|---|---|
| 2017/0073184 A1 | 3/2017 | Lotfi et al. |
| 2020/0283274 A1* | 9/2020 | Honjo ............... B66D 1/225 |
| 2021/0331902 A1 | 10/2021 | Lotfi et al. |

FOREIGN PATENT DOCUMENTS

| | | |
|---|---|---|
| EP | 3 147 253 A1 | 3/2017 |
| JP | 2013-056745 A | 3/2013 |
| JP | 2013-116813 A | 6/2013 |
| JP | 2018-043824 A | 3/2018 |
| JP | 6645937 B2 | 2/2020 |

OTHER PUBLICATIONS

Japanese Patent No. JP 2016222380 to Honjo published on Dec. 28, 2016.*
Search Report issued in European Application No. 21 21 8254.7, dated Jun. 21, 2022.

* cited by examiner

*Primary Examiner* — Pamela Rodriguez

(74) *Attorney, Agent, or Firm* — Michael Best & Friedrich LLP

(57) ABSTRACT

A winch brake device that is used for a work machine and generates a braking force on the basis of a brake manipulation, includes a pressing member that brings braking members into pressure contact with each other to generate the braking force, a first brake cylinder that applies a first pressing force for bringing the braking members into pressure contact with each other to the pressing member, and a second brake cylinder that applies a second pressing force different from the first pressing force to the pressing member. The first brake cylinder and the second brake cylinder are capable of applying the first pressing force or the second pressing force independently of each other.

10 Claims, 10 Drawing Sheets

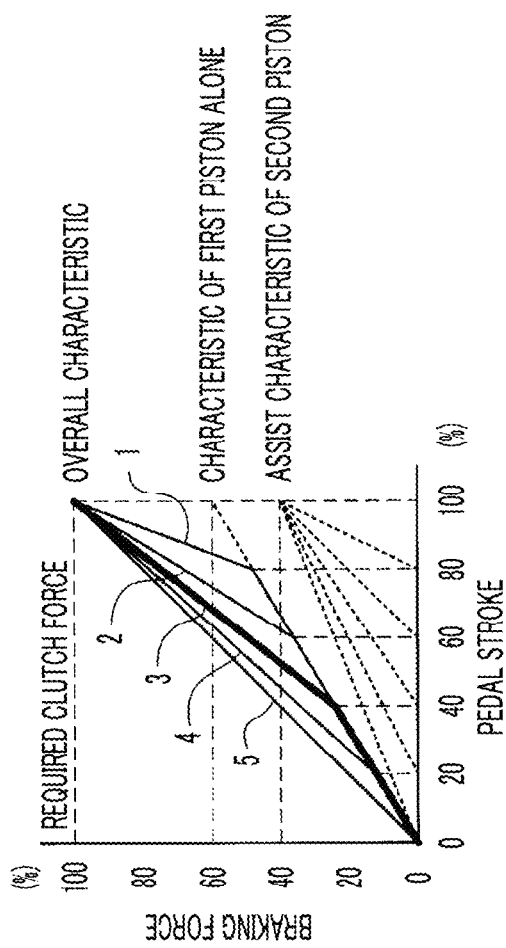
FIG. 9B
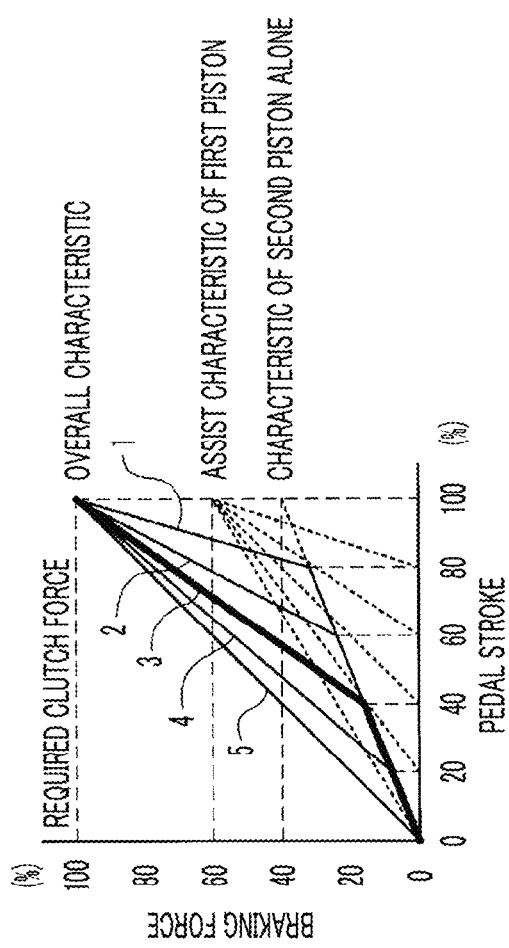
FIG. 9C
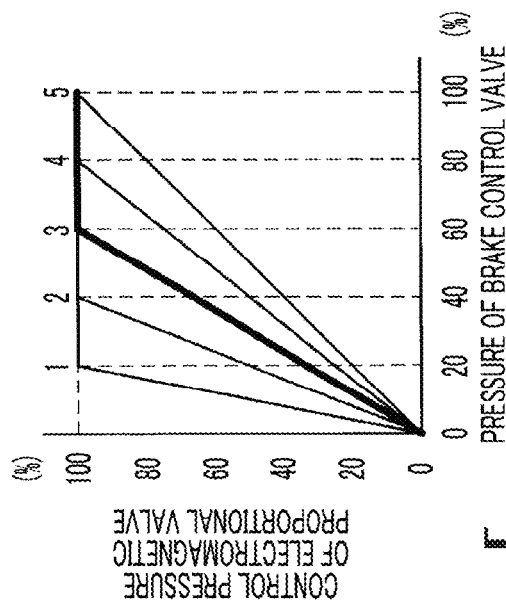
FIG. 9A

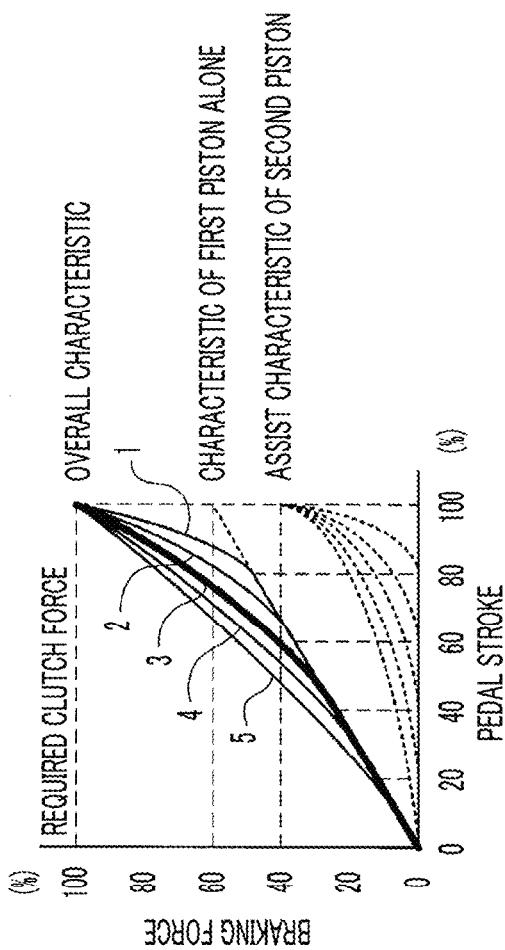
FIG. 10B
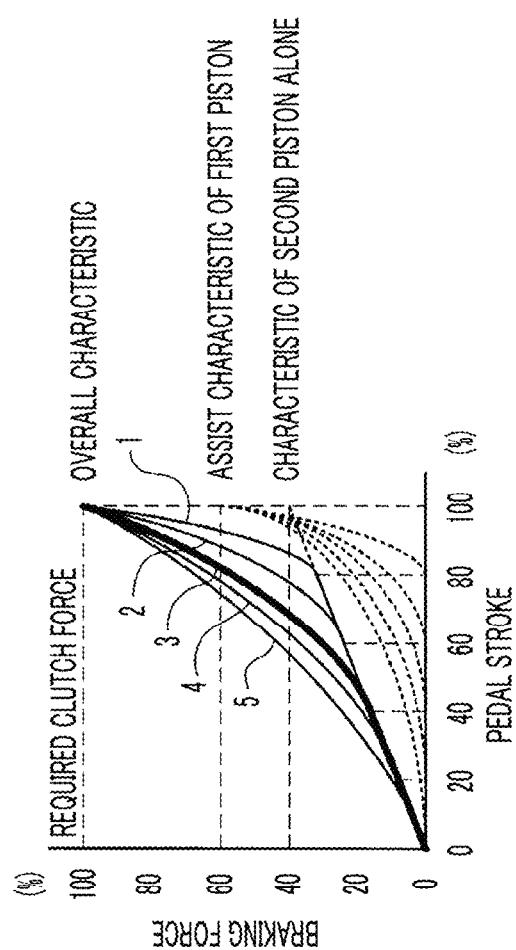
FIG. 10C
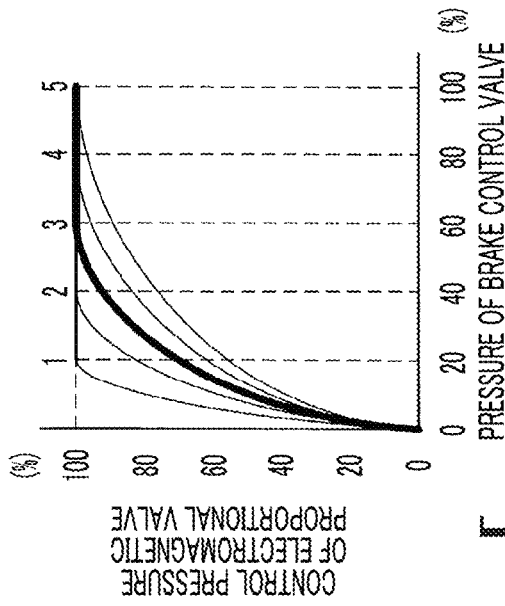
FIG. 10A
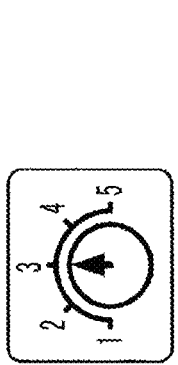

WINCH BRAKE DEVICE

RELATED APPLICATIONS

The content of Japanese Patent Application No. 2021-003628, on the basis of which priority benefits are claimed in an accompanying application data sheet, is in its entirety incorporated herein by reference.

BACKGROUND

Technical Field

Certain embodiments of the present invention relate to a winch brake device used for a work machine.

Description of Related Art

As a background technique in the present technical field, for example, the related art discloses a technique in which the control characteristics of a brake during the non-freefall of a crane and the braking characteristics of the brake during freefall can be changed by disposing two brake mechanisms (brake cylinders) in series.

SUMMARY

According to an embodiment of the present invention, there is provided a winch brake device that is used for a work machine and generates a braking force on the basis of a brake manipulation. The winch brake device includes a pressing member that brings braking members into pressure contact with each other to generate the braking force; a first brake cylinder that applies a first pressing force for bringing the braking members into pressure contact with each other to the pressing member; and a second brake cylinder that applies a second pressing force different from the first pressing force to the pressing member. The first brake cylinder and the second brake cylinder are capable of applying the first pressing force or the second pressing force independently of each other.

BRIEF DESCRIPTION OF THE DRAWINGS

FIG. 9A is a diagram showing control characteristics of an electromagnetic proportional valve, FIG. 9B is a diagram showing brake control characteristics in a heavy excavation mode, and FIG. 9C is a diagram showing brake control characteristics in a light excavation mode.

FIG. 10A is a diagram showing control characteristics of an electromagnetic proportional valve, FIG. 10B is a diagram showing brake control characteristics in a heavy excavation mode, and FIG. 10C is a diagram showing brake control characteristics in a light excavation mode.

DETAILED DESCRIPTION

According to the present invention, the operability of freefall work of the work machine (crane or the like) can be improved. In addition, the problems, configurations, and effects other than those described above will be apparent by the following description of the embodiments.

Since the freefall work of the crane occurs in various applications, braking characteristics of the brake according to diversified work (various loads during work) are required.

It is desirable to provide a winch brake device capable of improving the operability of freefall work of a work machine (crane or the like).

Hereinafter, embodiments in which a brake device according to the present invention is applied to a crane, which is an example of a work machine, will be described with reference to the drawings.

One Embodiment

Figure 1:
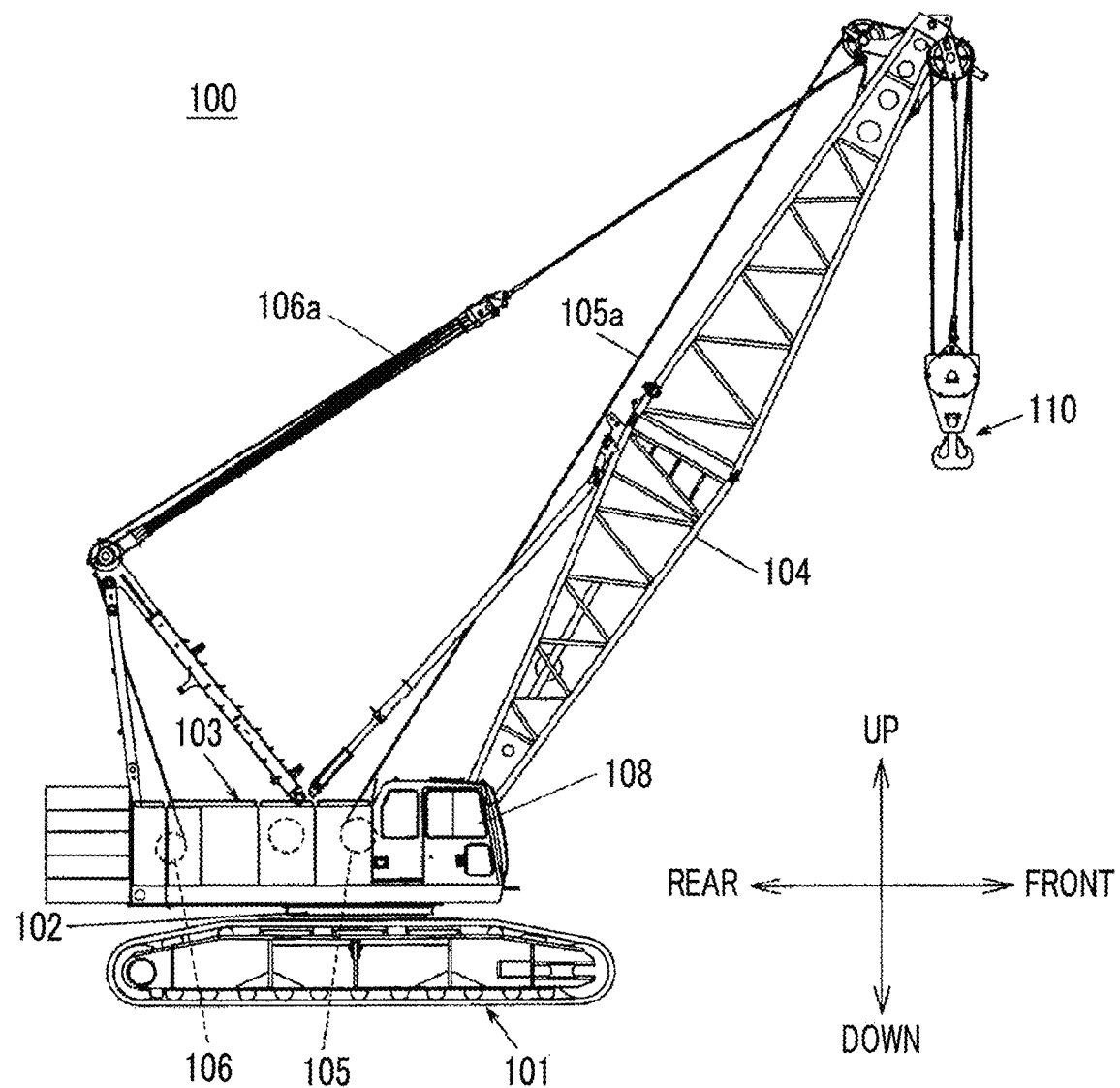
FIG. 1 is an external side view of a crane including a brake device according to one embodiment.

FIG. 1 is an external side view of a crane including a brake device according to one embodiment. The crane 100 includes an undercarriage 101, a turning body 103 turnably provided on the undercarriage 101 via a turning device 102, a boom 104 pivotably provided on the turning body 103 in a vertical direction, and a cab 108 on which an operator gets. The turning body 103 is mounted with a hoisting winch 105, which is a winch for hoisting, and a derricking winch 106, which is a winch for derricking the boom.

A hoisting rope 105a is wound around the hoisting winch 105. The hoisting rope 105a is wound or unwound by the rotation of the hoisting winch 105, and a hook 110 is lifted and lowered via a sheave provided at the tip of the boom 104. A derricking rope 106a is wound around the derricking winch 106. The derricking rope 106a is wound or unwound by the rotation of the derricking winch 106, and the boom 104 is derricked via a sheave provided at the tip of the boom 104.

Figure 2:
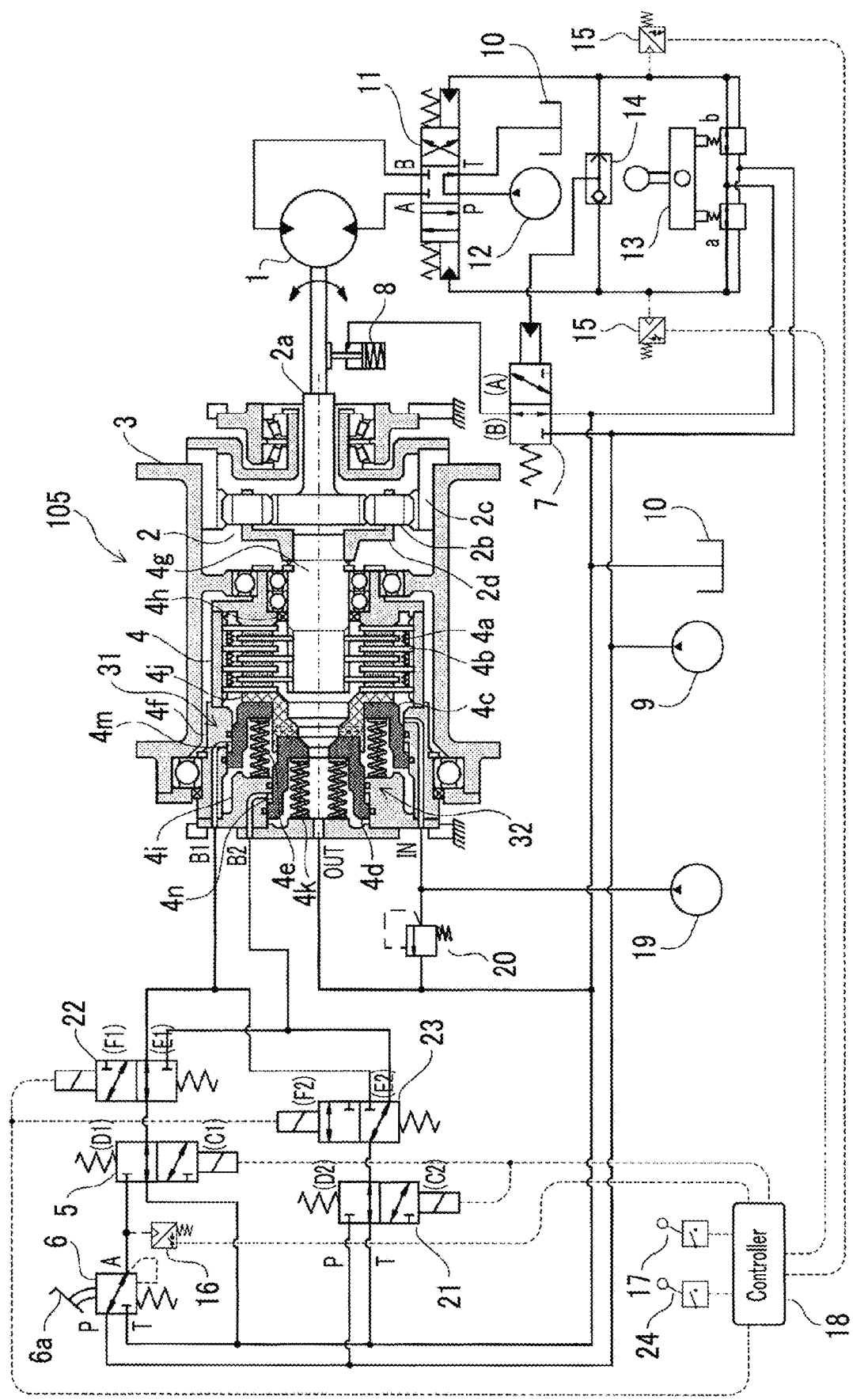
FIG. 2 is a hydraulic circuit diagram of a brake device according to the one embodiment.

The cab 108 includes a hoisting operation lever 13 for performing the hoisting and lowering manipulation of the hoisting winch 105, various operation levers (not shown) for performing the turning manipulation of the turning body 103 and performing the derricking manipulation of the derricking winch 106 of the boom 104, a controller 18 that performs the control of the crane 100, a brake mode change-over switch 17 that switches the operation mode of a brake device 4, a brake control characteristic change-over switch 24 that switches the control characteristics of the brake device 4, a monitor serving as notification means (not shown), and the like (refer to FIG. 2).

FIG. 2 is a hydraulic circuit diagram of the brake device according to the one embodiment of the present invention. In FIG. 2, a hydraulic circuit for driving the hoisting winch 105 is shown, and a hydraulic circuit for driving the derricking winch 106 is not shown.

The crane 100 includes the controller 18 that controls the operation of each part of the crane 100, an engine (not shown), and a main pump 12, a cooling oil pump 19, and a pilot pump 9 that are driven by the engine (not shown). The main pump 12, the cooling oil pump 19, and the pilot pump 9 discharge the hydraulic oil in a tank 10 as pressure oil.

Although not shown, the controller 18 includes a CPU that performs various arithmetic operations, a storage device such as a ROM or HDD that stores a program for executing an arithmetic operation by the CPU, a RAM that is a work area when the CPU executes the program, hardware including a communication interface, which is an interface for transmitting and receiving data to and from other devices, and software stored in the storage device and executed by the CPU. Each function of the controller 18 is realized by the CPU that loads various programs stored in the storage device into the RAM to execute the programs.

The hoisting winch 105 includes a winding drum 3, a hydraulic motor 1, a main pump 12, a control valve 11, a planetary reduction mechanism 2, and the brake device 4. The main pump 12 supplies the pressure oil to the hydraulic motor 1 and drives the hydraulic motor 1 to drive the hoisting and lowering of the winding drum 3. The control valve 11 controls the flow of the pressure oil from the main pump 12 to the hydraulic motor 1. The planetary reduction mechanism 2 transmits the driving force of the hydraulic motor 1 to the winding drum 3. The brake device 4 prevents the free rotation of the winding drum 3 by braking a carrier shaft 4g of the planetary reduction mechanism 2.

The planetary reduction mechanism 2 includes a sun gear 2a, a planetary gear 2b, and a ring gear 2c. An output shaft of the hydraulic motor 1 is connected to the sun gear 2a of the planetary reduction mechanism 2. The planetary gear 2b meshes with the sun gear 2a, and the ring gear 2c provided on an inner peripheral side of the winding drum 3 meshes with the planetary gear 2b. The planetary gear 2b is supported by a planetary carrier 2d. The carrier shaft 4g to which the planetary carrier 2d is secured is supported by a bearing inside the brake device 4. An outer peripheral surface of the carrier shaft 4g and a through-hole through which the carrier shaft 4g is inserted are sealed by an oil seal 4h.

Hereinafter, for convenience of explanation, the rotation axis direction of the hoisting winch 105, that is, the center axis direction of the carrier shaft 4g is simply referred to as an axial direction. Additionally, the side of both axial ends of the hoisting winch 105 on which the output shaft of the hydraulic motor 1 is disposed will be described as a front side of the hoisting winch 105, and an axially opposite side thereof will be described as a rear side of the hoisting winch 105.

Configuration of Brake Device

The brake device 4 also has a function as a clutch device for transmitting and cutting off the rotation between the hydraulic motor 1 and the winding drum 3. That is, the brake device 4 functions as a clutch and a parking brake during power hoisting and stopping, and functions as a service brake (regular brake) during freefall. In addition, in the present specification, the braking force required in a case where the brake device 4 is used as a clutch is defined as a "required clutch force".

The brake device 4 applied to the present embodiment is a negative type and is a wet multi-plate brake having a plurality of friction plates 4a. The brake device 4 mainly includes the plurality of friction plates (braking member) 4a, a plurality of mating plates (braking member) 4b engaged with the plurality of friction plates 4a, a first brake cylinder 31, a second brake cylinder 32, the carrier shaft 4g, the oil seal 4h, and a pressing member 4j.

The plurality of friction plates 4a are attached to an outer periphery of the carrier shaft 4g by spline coupling so as to be movable in the axial direction and constrained in a rotation direction. On the other hand, the plurality of mating plates 4b are alternately disposed with the plurality of friction plates 4a in the axial direction and are attached to an inner periphery of a casing by spline coupling so as to be free in the axial direction constrained in the rotation direction. By applying the pressing force to the mating plate 4b, the friction torque generated between the mating plate 4b and the friction plate 4a is transmitted to the carrier shaft 4g to generate a braking force.

The mating plates 4b are connected to each other by a spring. For this reason, in a brake-released state, the mating plates 4b move so as to be separated from each other, and a gap is formed between each friction plate 4a and each mating plate 4b. By forming the gap between the friction plate 4a and the mating plate 4b, the brake drag torque (rotational resistance caused by the viscosity of the oil between the friction plate 4a and the mating plate 4b (so-called drag torque)) during freefall is reduced.

The first brake cylinder 31 includes a first piston 4c, a plurality of springs (first springs) 4e that urge the first piston 4c, a first casing 4f that accommodates the first piston 4c, and a first pressure chamber 4m, which is a space formed in an annular shape between the first casing 4f and the first piston 4c.

The second brake cylinder 32 includes a second piston 4d, a plurality of springs (second springs) 4k that urge the second piston 4d, a second casing 4i that accommodates the second piston 4d, and a second pressure chamber 4n, which is a space formed in an annular shape between the second casing 4i and the second piston 4d.

The first piston 4c is urged with a first pressing force to the front side in the axial direction by the plurality of springs 4e. The second piston 4d is disposed coaxially with the first piston 4c inside the first piston 4c. Similar to the first piston 4c, the second piston 4d is urged with a second pressing force to the front side in the axial direction (to the right side in FIG. 2) by the plurality of springs 4k. Then, the first piston 4c and the second piston 4d can independently press the pressing member 4j.

Here, the springs 4e that urge the first piston 4c and the springs 4k that urge the second piston 4d have the same linear characteristic and the same spring performance (spring constant), and the number of springs 4e and the number of springs 4k are different from each other. That is, in the present embodiment, the springs 4e and the springs 4k have the same spring characteristic (the characteristic of being deformed when a force is applied and restored when a force is removed). Of course, the springs 4e and 4k may have non-linear characteristics or may have different spring constants from each other. Additionally, the number of springs 4e and the number of springs 4k may be the same.

In the present embodiment, the number of springs 4e that urges the first piston 4c is larger than the number of springs 4k that urges the second piston 4d. More specifically, the ratio of the number of springs 4e and the number of springs 4e is 6:4. Therefore, the pressing force of the first piston 4c to press the mating plates 4b is 1.5 times larger than that of the second piston 4d. In other words, the first piston 4c can generate a braking force 1.5 times larger than that of the second piston 4d. In addition, the total value of braking forces caused by the two brake cylinders 31 and 32 is set to be equal to the required clutch force. Therefore, the required clutch force is proportionally distributed between the first brake cylinder 31 and the second brake cylinder 32 at a ratio of 6:4. In other words, the total of the urging forces of the springs 4e and 4k is equal to a pressing force required to generate the required clutch force.

The pressure oil is supplied to the first pressure chamber 4m from a brake cylinder port B1. The pressure oil is supplied to the second pressure chamber 4n from a brake cylinder port B2. When the pressure oil is supplied to the first pressure chamber 4m, the first piston 4c is pressed to the rear side in the axial direction. When the pressure oil is supplied to the second pressure chamber 4n, the second piston 4d is pressed to the rear side in the axial direction. Therefore, the braking force of the brake device 4 becomes the smallest in a state where the first piston 4c and the second piston 4d are pressed to the rear side in the axial direction, and the braking force caused by the brake device 4 becomes the largest in a state where the first piston 4c or the second piston 4d is pressed to the front side in the axial direction.

In addition, a ratio (A1/A2) of a pressure reception area A1 of the pressure oil acting on the first pressure chamber 4m and a pressure oil reception area A2 acting on the second pressure chamber 4n is configured to be equal to the ratio of the pressing force of the first piston 4c and the pressing force of the second piston 4d. As described above, in the present embodiment, the ratio of the number of springs 4e that urge the first piston 4c to the number of springs 4k that urge the second piston 4d is 6:4. Thus, the ratio of the pressure reception area A1 and the pressure reception area A2 is also configured to be 6:4. Accordingly, a braking force proportional to the stepping amount of the brake pedal 6a can be generated. In other words, the ratio of the braking forces proportional to the stepping amount of the brake pedal 6a is also configured to be 6:4.

In addition, the ratio of the pressing force of the first piston 4c and the pressing force of the second piston 4d and the ratio of the pressure reception area A1 of the first pressure chamber 4m to the pressure reception area A2 of the second pressure chamber 4n may not necessarily coincide with each other. For example, a difference between the ratio of the pressing forces and the ratio of the pressure reception area may be in a range of ±10% (preferably in a range of ±5%). This includes a case where effective pressure reception areas are positively adjusted so as to have a required ratio in consideration of the pressure losses caused by the piston seals attached to the brake cylinder 31 and 32 in both pressure chambers 4m and 4n.

The pressing member 4j is provided so as to be capable of abutting against the first piston 4c and the second piston 4d and always press the mating plates 4b with the urging force of the spring 4e acting on the first piston 4c and the urging force of the spring 4k acting on the second piston 4d. That is, the brake device 4 always generates a braking force by the pressing force acting on the pressing member 4j toward the front side in the axial direction (negative brake). In addition, the shape of the pressing member 4j does not matter as long as the pressing member 4j is capable of simultaneously abutting against the first piston 4c and the second piston 4d.

The brake cylinder port B1 is connected to the pilot pump 9 via a brake control valve 6, a brake mode switching valve 5, and a brake control characteristic switching valve 22 and is also connected to the pilot pump 9 via a brake mode switching valve 21 and a brake control characteristic switching valve 23. Accordingly, the brake cylinder port B1 can selectively supply the pressure oil of which the pressure is adjusted by the brake control valve 6 and the pressure oil discharged from the pilot pump 9.

Additionally, similarly, the brake cylinder port B2 is also connected to the pilot pump 9 via the brake control valve 6, the brake mode switching valve 5, and the brake control characteristic switching valve 22 and is connected to the pilot pump 9 via the brake mode switching valve 21 and the brake control characteristic switching valve 23. Accordingly, the brake cylinder port B2 can also selectively supply the pressure oil of which the pressure is adjusted by the brake control valve 6 and the pressure oil discharged from the pilot pump 9.

Here, in order to cool the brake device 4, cooling oil (pressure oil) is forcedly circulated by the cooling oil pump 19. Specifically, the cooling oil discharged from the cooling oil pump 19 is supplied from the IN port to the inside of the brake device 4, absorbs the heat of the brake discs (the friction plate 4a and the mating plate 4b), and is then discharged from an OUT port and returned to the tank 10. An upper limit of the discharge pressure of the cooling oil pump 19 is limited by a casing internal pressure protection valve 20 that is a relief valve. For that reason, the internal pressure of the brake device 4 is also maintained to be equal to or lower than an upper limit of the casing internal pressure protection valve 20. In addition, a positional relationship between the IN port and the OUT port may be configured to be in a reverse relationship to that of the present embodiment.

Configuration of Hydraulic Circuit

The hydraulic circuit that drives the hoisting winch 105 is provided with a motor brake switching valve 7 that is switched and controlled by the manipulation of the hoisting operation lever 13, a motor brake cylinder 8, the brake control valve 6 that is manipulated by the brake pedal 6a, the brake mode switching valves 5 and 21 and the brake control characteristic switching valves 22 and 23, which are switched and controlled by the controller 18, and the casing internal pressure protection valve 20. In addition, the brake control valve 6 may be configured to operate depending on a brake manipulation or may be configured to operate depending on the stepping amount of the brake pedal 6a. In addition, the brake control valve 6 may be configured to operate depending on the stepping force of the brake pedal 6a, may be configured to operate by replacing this manipulation with a manual manipulation, or may be configured to operate depending on the rotational speed of the hoisting winch 105.

Additionally, the hydraulic circuit is provided with a plurality of manipulation pressure sensors 15 and one brake circuit pressure sensor 16 in order to switch the brake mode switching valves 5 and 21 to switch the operation mode (neutral brake mode/neutral free mode) of the brake device 4, and each sensor is connected to the controller 18. Moreover, the brake mode change-over switch 17 and the brake control characteristic change-over switch 24 are connected to the controller 18.

In addition, the brake mode change-over switch 17 is a switch that selects whether to set the operation mode to the neutral brake mode or the neutral free mode to be described below, and the brake control characteristic change-over switch 24 is a switch that selects whether to set a work mode to a heavy excavation mode and a light excavation mode to be described below.

Operation of Hydraulic Circuit

Next, the operation of the hydraulic circuit in the neutral brake mode, which is an operation mode for performing power hoisting and lowering, and the operation of the hydraulic circuit in the neutral free mode, which is an operation mode for performing freefall, will be described.

FIG. 2 shows the state of the neutral brake mode. When the brake mode change-over switch 17 is switched to the manipulation position of the neutral brake mode, the brake mode switching valves 5 and 21 and the brake control characteristic switching valves 22 and 23 are brought into a non-excited state as shown in FIG. 2. In this state, when the brake mode change-over switch 17 is switched to the manipulation position of the neutral free mode and the other conditions are satisfied, the brake mode switching valves 5 and 21 are excited and the operation mode is switched to the neutral free mode.

Operation During Power Hoisting and Lowering (Neutral Brake Mode)

When the hoisting operation lever 13 shown in FIG. 2 is manipulated to the hoisting position or the lowering position, the pilot pressure from the pilot pump 9 acts on the control valve 11 to drive a spool of the control valve 11, and the pressure oil discharged from the main pump 12 is supplied to the hydraulic motor 1 via the control valve 11. At the same time, the pilot pressure from the pilot pump 9 also acts on the motor brake switching valve 7 via a high-pressure selection valve 14. Accordingly, since the motor brake switching valve 7 is switched to a position (A), and the pilot pressure from the pilot pump 9 drives the motor brake cylinder 8 to a brake open side, the hydraulic motor 1 is rotationally driven. In addition, the motor brake switching valve 7 may be an electromagnetic switching valve that performs electrical switching by a detection signal of the manipulation pressure sensor 15.

In the neutral brake mode, the brake mode switching valves 5 and 21 and the brake control characteristic switching valves 22 and 23 are in the non-excited state. Therefore, the brake mode switching valves 5 and 21 are switched to positions (D1) and (D2), respectively, and the brake control characteristic switching valves 22 and 23 are switched to positions (E1) and (E2), respectively. In addition, the brake control characteristic switching valves 22 and 23 may not be switched to the positions (E1) and (E2). That is, the neutral brake mode may be started in a state where the brake control characteristic switching valves 22 and 23 are at positions (F1) and (F2), respectively.

The pilot pressure from the pilot pump 9, which is a brake release pressure, is cut off by the brake mode switching valves 5 and 21, and the first pressure chamber 4m and the second pressure chamber 4n communicate with the tank 10. The first pressure chamber 4m and the second pressure chamber 4n have tank pressures, the spring 4e urges the first piston 4c, and the spring 4k urges the second piston 4d. The urging forces of the springs 4e and 4k acting on the first piston 4c and the second piston 4d are transmitted to the pressing member 4j, and the pressing member 4j presses the mating plates 4b. As a result, the friction plates 4a and the mating plates 4b are pressed against each other, a braking force is applied to the planetary carrier 2d, and the planetary carrier 2d is fixed.

In the neutral brake mode, when the sun gear 2a of the planetary reduction mechanism 2 is pivoted by the rotational driving force of the hydraulic motor 1, the planetary gear 2b rotates on its axis and the winding drum 3 connected to the ring gear 2c and the ring gear 2c are pivoted, and the hoisting or lowering caused by the power is performed.

Operation During Freefall (Neutral Free Mode)

When the hoisting operation lever 13 is manipulated to a neutral position, the flow of the pressure oil from the main pump 12 to the hydraulic motor 1 is cut off by the control valve 11. Since the pilot pressure oil is not supplied to the motor brake switching valve 7 via the high-pressure selection valve 14, the motor brake switching valve 7 is switched to the position (B). Since the pilot pressure to the motor brake cylinder 8 is cut off by the motor brake switching valve 7, the motor brake is operated by the urging force of a spring. In this state, when the brake mode switching valves 5 and 21 are excited and the braking force of the brake device 4 is released, the winding drum 3 freely rotates due to the weight of a suspended cargo suspended from the hook 110.

The switching to the neutral free mode is performed as the brake mode switching valves 5 and 21 are operated by the command of the controller 18 on the basis of the respective determination values of the manipulation pressure sensor 15, the brake circuit pressure sensor 16, and the brake mode change-over switch 17. For example, when it is detected that the brake mode change-over switch 17 has been switched to the manipulation position of the neutral free mode in a state where the manipulation pressure detected by the manipulation pressure sensor 15 is smaller than a predetermined threshold (that is, the hoisting operation lever 13 is neutral) and the circuit pressure detected by the brake circuit pressure sensor 16 is smaller than a predetermined threshold (that is, in a state where the brake pedal 6a is stepped), the controller 18 switches the operation mode from the neutral brake mode to the neutral free mode.

Here, in the present embodiment, the heavy excavation mode (first work mode) and the light excavation mode (second work mode) are prepared in advance as work modes in the neutral free mode. The heavy excavation mode is a mode suitable for a case where a heavy suspended cargo dropped due to its own weight (heavy load work), and the light excavation mode is a mode suitable for a case where a relatively light suspended cargo is dropped due to its own weight (light load work). Specifically, brake control characteristics are different between the heavy excavation mode and the light excavation mode, and the heavy excavation mode is set to have a larger braking force than the light excavation mode. Hereinafter, the operation of the hydraulic circuit in each excavation mode will be described.

Heavy Excavation Mode

When the brake control characteristic change-over switch 24 switches to the position of the heavy excavation mode, the work mode switches to the heavy excavation mode. In the heavy excavation mode, the brake mode switching valves 5 and 21 are in an excited state, and the brake control characteristic switching valves 22 and 23 are in the non-excited state. That is, in the heavy excavation mode, the brake mode switching valves 5 and 21 are switched to positions (C1) and (C2), respectively, and the brake control characteristic switching valves 22 and 23 are switched to the positions (E1) and (E2), respectively.

Then, the pilot pressure adjusted by the brake control valve 6 (the pilot pressure according to the stepping amount of the brake pedal 6a) is applied to the brake mode switching valve 5, and the pilot pressure from the pilot pump 9, which is the brake release pressure (maximum pressure), is directly applied to the brake mode switching valve 21. The pilot pressure adjusted by the brake control valve 6 acts on the first pressure chamber 4m via the brake cylinder port B1. For that reason, the first piston 4c presses the pressing member 4j with a pressing force corresponding to a difference between the urging force of the spring 4e and the pilot pressure acting on the first pressure chamber 4m.

Meanwhile, the pilot pressure (brake release pressure) from the pilot pump 9 directly acts on the second pressure chamber 4n via the brake cylinder port B2. More specifically, the maximum discharge pressure of the pilot pump 9 acts on the second pressure chamber 4n. For that reason, the second piston 4d is held on the rear side in the axial direction (left side in FIG. 2) against the urging force of the spring 4k, and the braking caused by the second piston 4d is released.

In this way, in the heavy excavation mode, the first brake cylinder 31 operates independently of the second brake cylinder 32, and only a braking force caused by the first brake cylinder 31 is generated. Then, the braking force in the heavy excavation mode follows the spring characteristic of the spring 4e that urges the first piston 4c.

Light Excavation Mode

When the brake control characteristic change-over switch 24 switches to the position of the light excavation mode, the work mode switches to the light excavation mode. In the light excavation mode, the brake mode switching valves 5 and 21 are in the excited state, and the brake control characteristic switching valves 22 and 23 are in the excited state. That is, in the light excavation mode, the brake mode switching valves 5 and 21 are switched to the positions (C1) and (C2), respectively, and the brake control characteristic switching valves 22 and 23 are switched to the positions (F1) and (F2), respectively.

Then, the pilot pressure adjusted by the brake control valve 6 (the pilot pressure according to the stepping amount of the brake pedal 6a) is applied to the brake mode switching valve 5, and the pilot pressure from the pilot pump 9, which is the brake release pressure, is directly applied to the brake mode switching valve 21. In the light excavation mode, the positions of the brake control characteristic switching valves 22 and 23 are switched to the positions (F1) and (F2), respectively. Therefore, the pilot pressure adjusted by the brake control valve 6 acts on the second pressure chamber 4n via the brake cylinder port B2. For that reason, the second piston 4d presses the pressing member 4j with a pressing force corresponding to a difference between the urging force of the spring 4k and the pilot pressure acting on the second pressure chamber 4n.

Meanwhile, the pilot pressure (brake release pressure) from the pilot pump 9 acts directly on the first pressure chamber 4m via the brake cylinder port B1. More specifically, the maximum discharge pressure of the pilot pump 9 acts on the first pressure chamber 4m. For that reason, the first piston 4c is held on the rear side in the axial direction (left side in FIG. 2) against the urging force of the spring 4e, and the braking caused by the first piston 4c is released.

In this way, in the light excavation mode, the second brake cylinder 32 operates independently of the first brake cylinder 31, and only a braking force caused by the second brake cylinder 32 is generated. Then, the braking force in the light excavation mode follows the spring characteristic of the spring 4k that urges the second piston 4d. By exciting the brake control characteristic switching valves 22 and 23 in this way, the brake cylinders 31 and 32 that generate the braking forces are selectively switched.

Next, various characteristics of the brake device 4 according to the present embodiment will be described with reference to FIGS. 3A to 3D. FIG. 3A is a diagram showing the braking force characteristic of the first piston 4c, the horizontal axis represents the pressure acting on the first pressure chamber 4m, and the vertical axis represents a braking force caused by the first piston 4c. FIG. 3B is a diagram showing the braking force characteristic of the second piston 4d, the horizontal axis represents the pressure acting on the second pressure chamber 4n, and the vertical axis represents a braking force by the second piston 4d.

As described above, in the present embodiment, the ratio of the number of springs 4e that urge the first piston 4c to the number of springs 4k that urge the second piston 4d is 6:4. Therefore, assuming that the required clutch force is 100% (the maximum value of the braking force), the required clutch force is proportionally distributed such that the maximum braking force of the first piston 4c is 60% of the required clutch force (refer to FIG. 3A) and the maximum braking force of the second piston 4d is 40% of the required clutch force (refer to FIG. 3B). Since the spring 4e has the linear characteristic, the braking force of the first piston 4c decreases linearly as the pressure acting on the first pressure chamber 4m increases. Similarly, as the pressure acting on the second pressure chamber 4n increases, the braking force of the second piston 4d also decreases linearly.

In addition, the braking force characteristic of the first piston 4c and the braking force characteristic of the second piston 4d are adjusted by changing the spring characteristics of the springs 4e and 4k and the pressure reception areas of the first piston 4c and the second piston 4d.

Figure 3C:
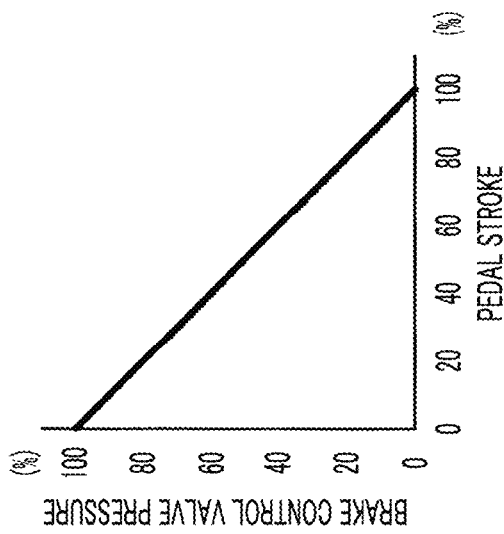
FIG. 3C is a diagram showing the pressure characteristic of a brake control valve.

FIG. 3C is a diagram showing the pressure characteristic of the brake control valve 6. The horizontal axis represents a pedal stroke. The pedal stroke indicates the proportion of the pedal stroke (stepping amount), assuming that a state where the brake pedal 6a is fully stepped is 100% and a non-manipulated state where the brake pedal 6a is not stepped is 0%.

As shown in FIG. 3C, the pressure characteristic of the brake control valve 6 is a characteristic that the pressure decreases linearly depending on an increase in the pedal stroke in a range where the pedal stroke is 0% or more and 100% or less. In addition, the pressure characteristic of the brake control valve 6 may be a characteristic that the pressure does not necessarily decrease linearly depending on an increase in the pedal stroke.

Figure 3D:
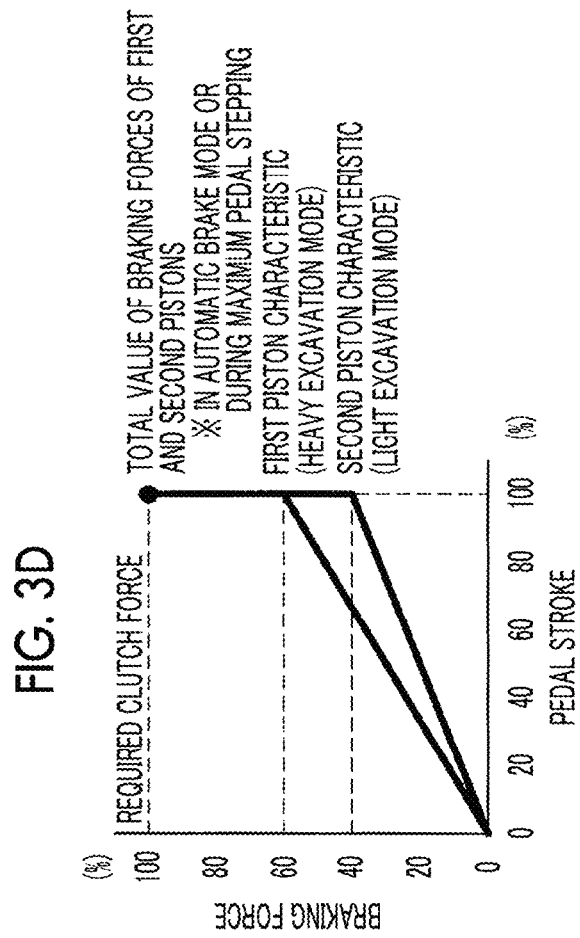
FIG. 3D is a diagram showing brake control characteristics.
Figure 3A:
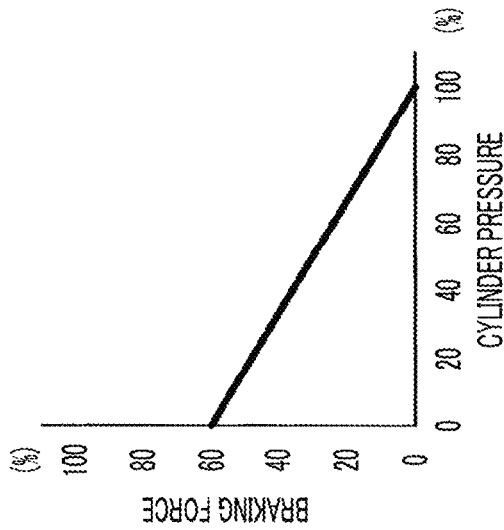
FIG. 3A is a diagram showing the braking force characteristic of a first piston.
Figure 3B:
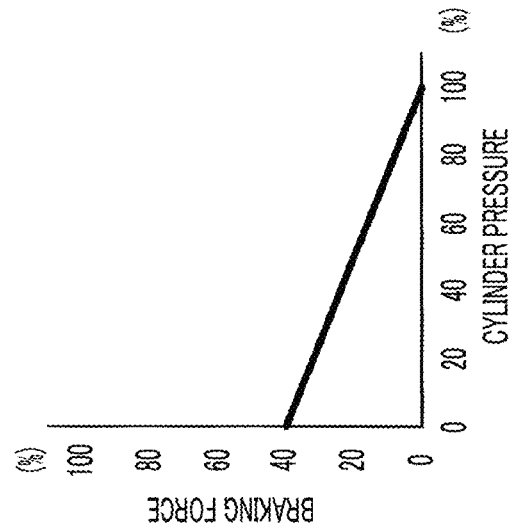
FIG. 3B is a diagram showing the braking force characteristic of a second piston.

FIG. 3D is a diagram showing brake control characteristics, in which the horizontal axis represents the pedal stroke and the vertical axis represents the braking force. FIG. 3D shows the proportion of the braking force with the required clutch force as 100%. As shown in FIG. 3D, in the heavy excavation mode, the braking force increases linearly in a range of 0% to 60% depending on an increase in the pedal stroke. On the other hand, in the light excavation mode, the braking force increases linearly in a range of 0% to 40% depending on an increase in as the pedal stroke. Then, when it is detected that the pedal stroke is 100%, the brake mode switching valves 5 and 21 are immediately brought into the non-excited state and temporarily switched to the neutral brake mode. For that reason, the first brake cylinder 31 and the second brake cylinder 32 cooperate to generate a braking force, and the braking force becomes the required clutch force (100%).

In this way, in the present embodiment, the braking force can be generated with different brake control characteristics in the heavy excavation mode and the light excavation mode in a range where the pedal stroke is 0% to 100%.

Figure 4:
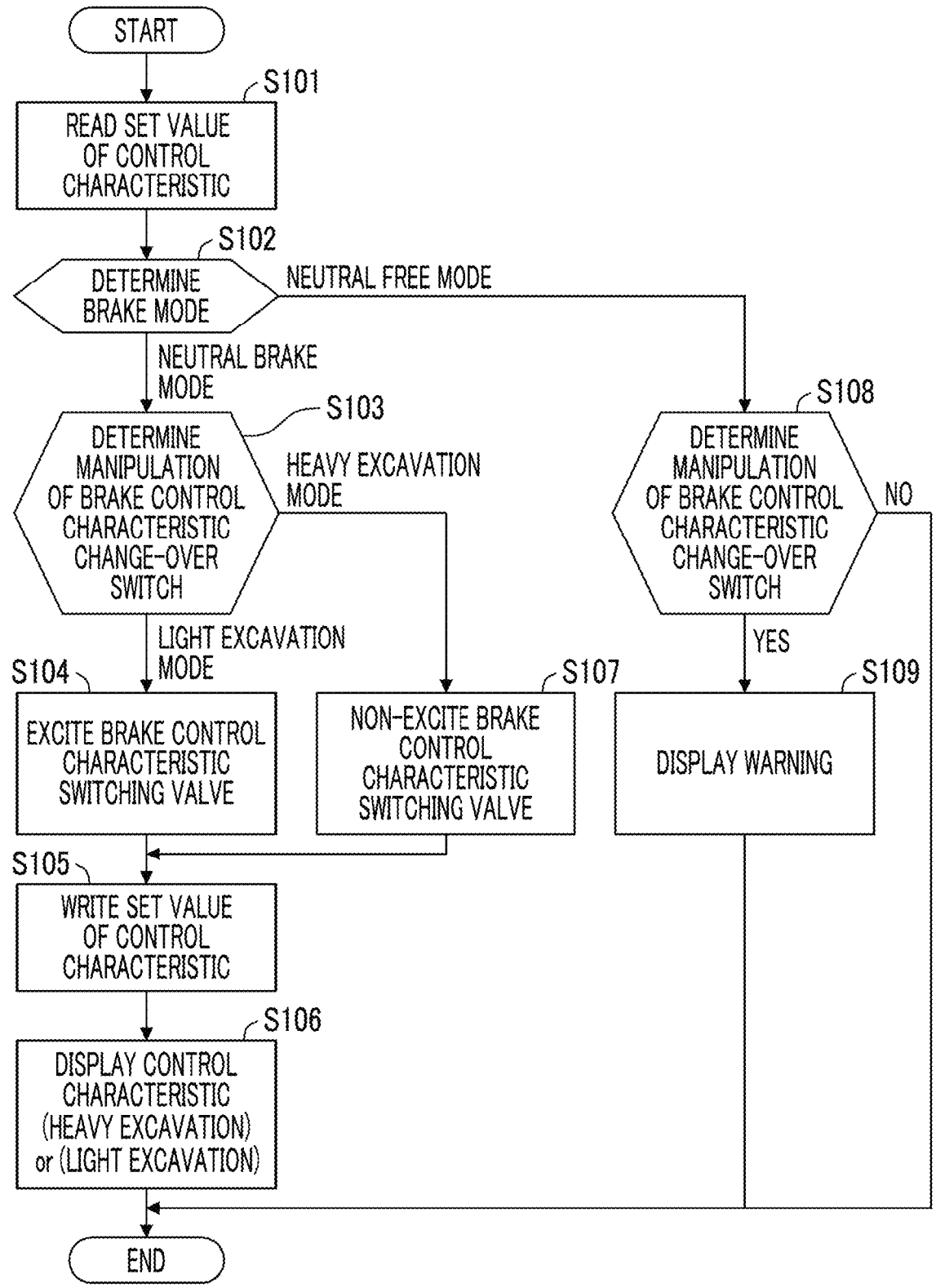
FIG. 4 is a flowchart showing a procedure of control processing of a brake device by a controller.

Next, the control of the brake device 4 by the controller 18 will be described. FIG. 4 is a flowchart showing a procedure of control processing of the brake device 4 by the controller 18. As shown in FIG. 4, first, the controller 18 reads the set value of the current brake control characteristic stored in the RAM (S101). That is, the controller 18 determines whether the current operation mode is the heavy excavation mode or the light excavation mode.

Next, the controller 18 determines a brake mode determination as to whether the current operation mode is the neutral free mode or the neutral brake mode (S102). In a case where the result of the brake mode determination is the neutral brake mode, the controller 18 performs a manipulation determination as to whether or not the brake control characteristic change-over switch 24 has been manipulated (S103). In a case where it is determined that the operation to switch to the light excavation mode is performed by an input signal from the brake control characteristic change-over switch 24, the controller 18 outputs a command to excite the brake control characteristic switching valves 22 and 23 (S104).

Here, in the present embodiment, even in a case where the mode is temporarily switched to the neutral brake mode during the hoisting manipulation in S102, the mode can be switched to the light excavation mode or the heavy excavation mode by the manipulation of the brake control characteristic change-over switch 24. However, in a case where the mode is temporarily switched to the neutral brake mode, the switching of the work mode may be prohibited or disabled. In other words, the brake control characteristic change-over switch 24 may be enabled only in a permanent neutral brake mode.

Next, the controller 18 writes the set value of the brake control characteristic (in this case, the light excavation mode) to the RAM, and updates the set value (S105). Next, the controller 18 displays the setting of the brake control characteristic on the monitor in the cab 108 (S106). That is, the controller 18 displays, on the monitor, the fact that the mode is in the heavy excavation mode or the light excavation mode.

On the other hand, in a case where the controller 18 determined in S103 that the manipulation to switch to the heavy excavation mode has been performed, a command to non-excite the brake control characteristic switching valves 22 and 23 is output (S107), and the process proceeds to S105.

Additionally, in S102, in a case where the result of the brake mode determination is the neutral free mode, the controller 18 performs a manipulation determination as to whether or not the brake control characteristic change-over switch 24 has been manipulated (S108), and in a case where it is determined that the manipulation has been performed (S108/YES), the controller 18 performs, on the monitor, a warning display indicating that the change of the brake control characteristics (the switching between the heavy excavation mode and the light excavation mode) cannot be performed (S109), and disables the manipulation of the brake control characteristic change-over switch 24. That is, the switching between the heavy excavation mode and the light excavation mode is prohibited during the neutral free mode.

On the other hand, in S108, when the controller 18 determines that the brake control characteristic change-over switch 24 is not manipulated (S108/NO), the process ends.

According to the one embodiment configured as described above, the following effects can be obtained.

The brake device 4 includes the first brake cylinder 31 and the second brake cylinder 32, and the first brake cylinder 31 and the second brake cylinder 32 can independently press the pressing member 4j to generate a braking force. Also, the braking characteristic of the first brake cylinder 31 and the braking characteristic of the second brake cylinder 32 are different from each other (the numbers of the spring 4e and the spring 4k are different from each other). For that reason, the operator can manipulate the crane 100 while generating the braking force with the braking characteristic of the first brake cylinder 31 depending on work contents, and can also manipulate the crane 100 while generating the braking force with the braking characteristic of the second brake cylinder 32. Therefore, the operability of the crane 100 during the freefall work is improved.

In particular, in a case where the suspended cargo is heavy, the operator can generate a braking force larger than the light excavation mode by selecting the heavy excavation mode. Therefore, the manipulation of the brake pedal 6a according to the operator's feeling is possible. On the contrary, in a case where the suspended cargo is light, the operator selects the light excavation mode. Accordingly, even when the brake pedal 6a is stepped by a predetermined amount, only a braking force smaller than that in the heavy excavation mode is generated. Therefore, the operability is improved even in the light load work. In this way, in the present embodiment, even with one brake device 4, it is possible to select one of two different braking characteristics depending on the load of the suspended cargo to suitably perform the freefall work.

Moreover, in the one embodiment, the braking characteristics of the brake device 4 are physically (mechanically) switched by switching between the first brake cylinder 31 and the second brake cylinder 32. Therefore, the reliability is high. If the pressure of the pressure oil acting on the first brake cylinder 31 and the second brake cylinder 32 is electrically controlled, there is a possibility that a braking force is not secured when an electronic component fails. Therefore, this is not suitable for brake devices in which high safety is required. However, when the configuration as in the one embodiment is adopted, the braking characteristics are physically (mechanically) switched. Therefore, there is no such concern.

Additionally, the selection of the heavy excavation mode and the light excavation mode is controlled so as to be performed only in the neutral brake mode in the brake mode determination (S102). For that reason, work safety is improved. Specifically, since the suspended cargo is dropped by its own weight in the neutral free mode, when the operation mode is switched to the heavy excavation mode or the light excavation mode during this period, the braking characteristics are different. Therefore, the operator needs to adjust the stepping amount of the brake pedal 6a. Moreover, there is a possibility that the behavior of the hydraulic circuit is temporarily unstable due to the responsiveness during the switching of the operation mode. In this respect, as in the present embodiment, since the heavy excavation mode and the light excavation mode can be selected only in the neutral brake mode, there is an advantage that the work can be safely performed without such a concern.

In addition, in the neutral free mode, the switching from the heavy excavation mode to the light excavation mode is prohibited. However, when the switching from the light excavation mode to the heavy excavation mode is enabled, the operability of the operator can be further improved while ensuring safety.

Additionally, since the information on the heavy excavation mode, the light excavation mode, various warning information, and the like are displayed on the monitor, the operator can visually recognize the operation mode easily, and the operability of the crane 100 is further improved. In addition, instead of the warning display by the monitor, a warning may be performed by using notification means such as a buzzer or a lamp.

Additionally, in the one embodiment, when it is detected that the pedal stroke is 100%, the brake mode switching valves 5 and 21 are immediately brought into the non-excited state and temporarily switched to the neutral brake mode, and a braking force equal to the required clutch force (100%) is generated. For that reason, the crane 100 can be safely manipulated. Of course, a configuration may be adopted in which a braking force lower than the required clutch force is generated when the pedal stroke is 100%.

Here, the brake device 4 according to the one embodiment can be variously modified as described below.

Modification Example 1-1

Figure 5:
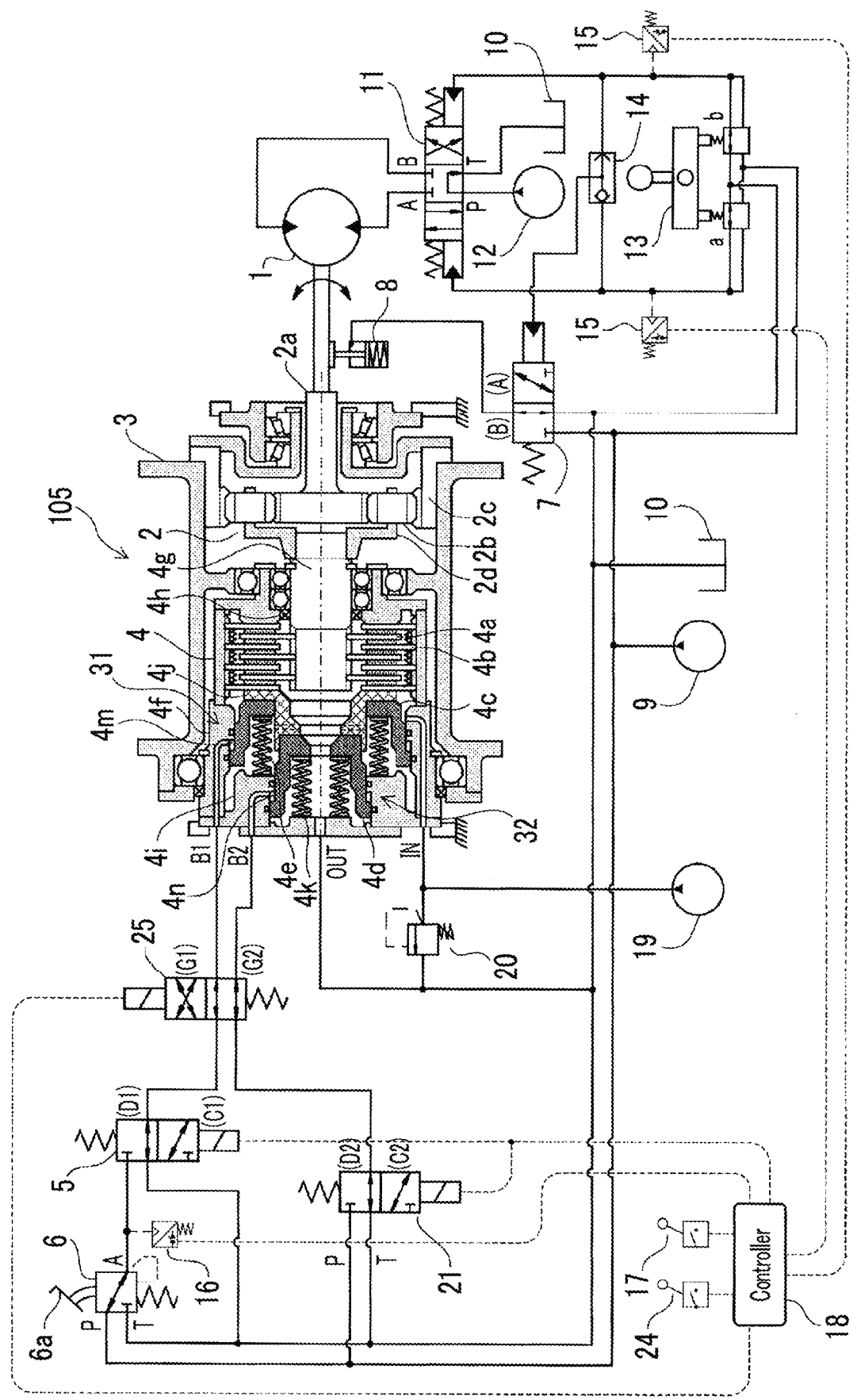
FIG. 5 is a hydraulic circuit diagram of a brake device according to Modification Example 1-1.

FIG. 5 is a hydraulic circuit diagram of the brake device 4 according to Modification Example 1-1. Modification Example 1-1 shown in FIG. 5 has a feature in that a brake control characteristic switching valve 25 in which the functions of the brake control characteristic switching valves 22 and 23 are integrated is provided instead of providing the brake control characteristic switching valves 22 and 23 shown in FIG. 2.

The brake control characteristic switching valve 25 shown in FIG. 5 is in the non-excited state, and the brake control characteristic switching valve 25 is switched to a position (G2). When the brake mode switching valves 5 and 21 are excited in this state, the pilot pressure adjusted by the brake control valve 6 acts on the first pressure chamber 4$m$, and the pilot pressure (brake release pressure) discharged from the pilot pump 9 acts on the second pressure chamber 4$n$. Then, a braking force is generated by the first brake cylinder 31 depending on the stepping amount of the brake pedal 6$a$. Therefore, the case where the brake control characteristic switching valve 25 is in the non-excited state is the heavy excavation mode.

Meanwhile, in a case where the operation mode is switched from the heavy excavation mode to the light excavation mode, the controller 18 outputs a command to excite the brake control characteristic switching valve 25. Then, the brake control characteristic switching valve 25 switches from the position (G2) to a position (G1). Then, the pilot pressure adjusted by the brake control valve 6 acts on the second pressure chamber 4$n$, and the pilot pressure (brake release pressure) discharged from the pilot pump 9 acts on the first pressure chamber 4$m$. Then, a braking force is generated by the second brake cylinder 32 depending on the stepping amount of the brake pedal 6$a$.

In this way, the brake device 4 according to Modification Example 1-1 also has the same effects as those of the one embodiment. Moreover, in Modification Example 1-1, the number of brake control characteristic switching valves is small. Therefore, there is an advantage that the configuration of the hydraulic circuit can be simplified.

Modification Example 1-2

Figure 6:
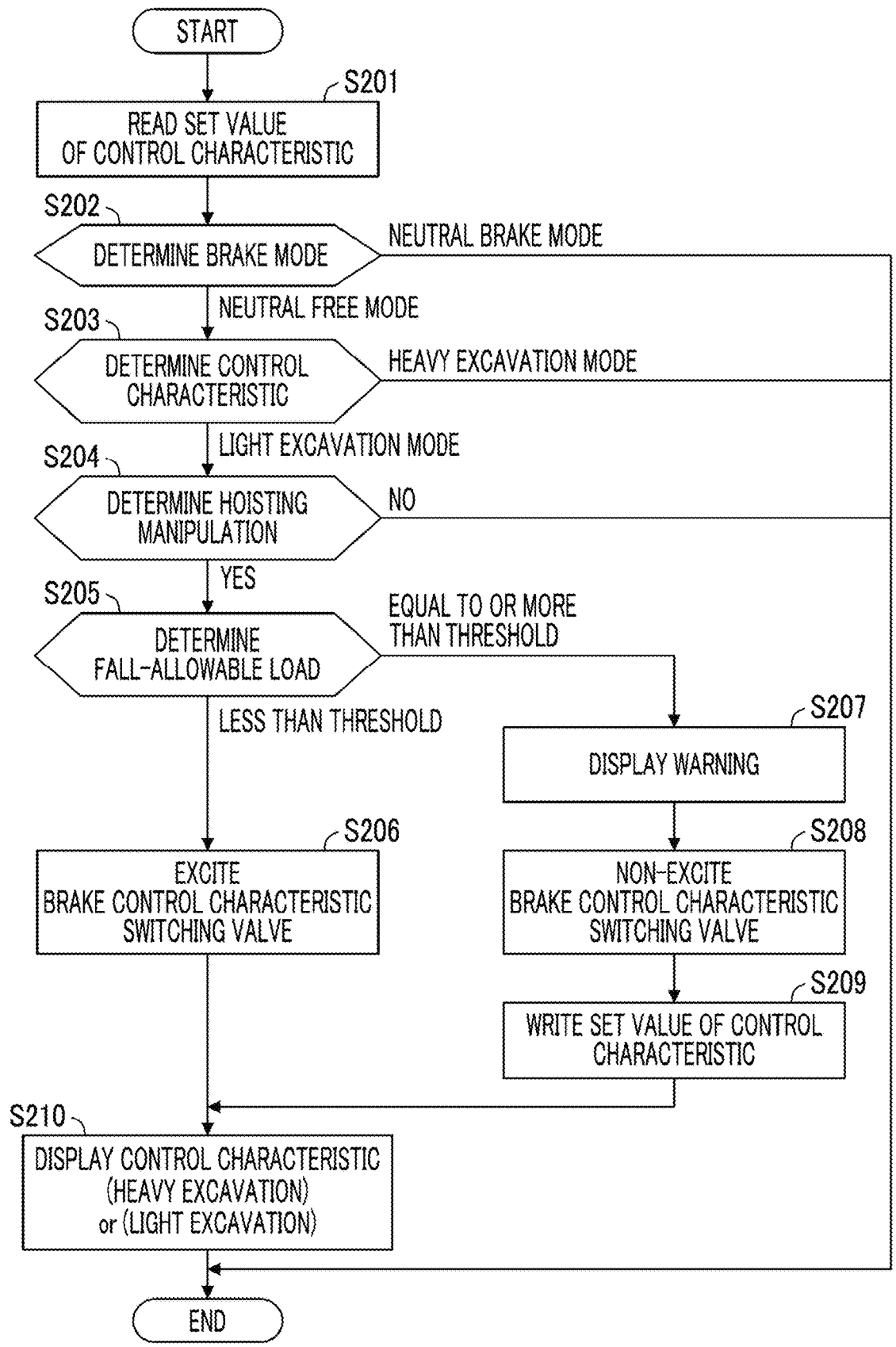
FIG. 6 is a flowchart showing a procedure of control processing of a brake device according to Modification Example 1-2.

FIG. 6 is a flowchart showing a procedure of control processing of the brake device 4 according to Modification Example 1-2. As shown in FIG. 6, first, the controller 18 reads the set value (heavy excavation mode or light excavation mode) of the current brake control characteristic stored in the RAM (S201). Next, the controller 18 performs a brake mode determination for determining whether the current operation mode is the neutral free mode or the neutral brake mode (S202).

In a case where the result of the brake mode determination is the neutral free mode, the controller 18 performs a control characteristic determination for determining whether the set value of the brake control characteristic read in S201 is the heavy excavation mode or the light excavation mode. (S203). In a case where the controller 18 determines in S203 that the current operation mode is the light excavation mode, the controller 18 determines whether or not the hoisting manipulation has been performed (S204). Specifically, the controller 18 determines whether or not the hoisting manipulation by the hoisting operation lever 13 has been performed on the basis of a detection signal input from the manipulation pressure sensor 15.

In a case where the answer is YES in S204, the controller 18 detects a load (the load of the suspended cargo) acting on the hoisting rope 105$a$ with a load detector (not shown) and performs, on the basis of this detected value, a fall-allowable load determination as to whether or not the freefall of the suspended cargo is permitted (S205). In a case where the detection value of the load detector is less than a threshold, the controller 18 outputs a command to excite the brake control characteristic switching valves 22 and 23 (S206).

On the other hand, in a case where the detection value of the load detector is equal to or more than the threshold, the controller 18 performs a warning display to change to the heavy excavation mode on the monitor (S207). Next, the controller 18 outputs a command to non-excite the brake control characteristic switching valves 22 and 23 (S208) and writes the set value of the brake control characteristic to the RAM (S209). In this case, the heavy excavation mode is written in the RAM. Then, the controller 18 displays the current brake control characteristic on the monitor (S210). Specifically, the controller 18 displays, on the monitor, the fact that the current operation mode is the heavy excavation mode or the light excavation mode.

In addition, in a case where it is determined in S202 that the mode is in the neutral brake mode and in a case where it is determined in S203 that the mode is in the heavy excavation mode, and in a case where it is determined in S204 that the hoisting manipulation is not performed (S204/NO), the controller 18 ends the process.

In Modification Example 1-2, in a case where the current operation mode is the neutral free mode and the light excavation mode, the manipulation of the hoisting operation lever 13 and the load of the suspended cargo acting on the hoisting rope 105$a$ are detected (S204, S205), in a case where the load of the suspended cargo is less than the threshold, the light excavation mode is continued as it is and the brake control characteristic switching valves 22 and 23 are excited (S206), and in a case where the load of the suspended cargo is equal to or more than the threshold, the brake control characteristic switching valves 22 and 23 are automatically non-excited and shifted to the heavy excavation mode (S208). Therefore, the usability is excellent for the operator, and the safety is also excellent.

In addition, in Modification Example 1-2, the controller 18 may store the state of automatically switching to the heavy excavation mode in S208 in the RAM and reflect the state in the next hoisting manipulation or may be the process limited to the current hoisting manipulation. Additionally, the load of the suspended cargo may be detected by a device other than the load detector.

Modification Example 1-3

Figure 7:
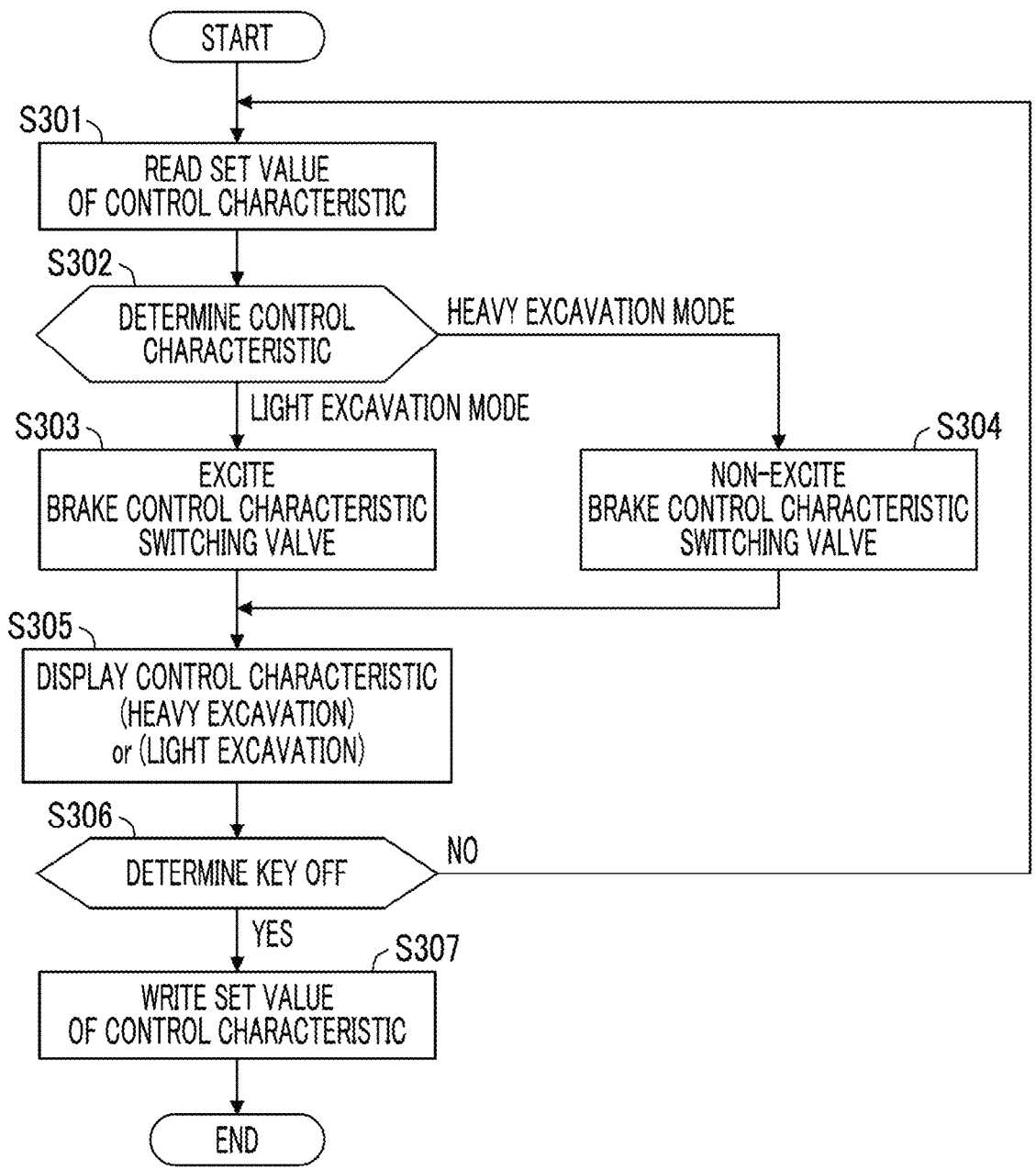
FIG. 7 is a flowchart showing a procedure of control processing of the brake device according to Modification Example 1-3.

FIG. 7 is a flowchart showing a procedure of control processing of the brake device 4 according to Modification Example 1-3. As shown in FIG. 7, first, the controller 18 reads the current brake control characteristic set value (heavy excavation mode or light excavation mode) stored in the RAM (S301) and performs a control characteristic determination for determining whether the read brake control characteristic set value is the heavy excavation mode or the light excavation mode (S302). In a case where the controller 18 determines in S302 that the mode is the light excavation mode, the controller 18 outputs a command to excite the brake control characteristic switching valves 22 and 23 (S303). On the other hand, in a case where the controller 18 determines in S302 that the mode is the heavy excavation mode, the controller 18 outputs a command to non-excite the brake control characteristic switching valves 22 and 23 (S304). Then, the controller 18 displays the current brake control characteristic on the monitor (S305). Specifically, the controller 18 displays, on the monitor, the fact that the current operation mode is the heavy excavation mode or the light excavation mode.

Next, the controller 18 performs a key OFF determination for determining whether or not a key switch of an engine is turned off (that is, the operation of the crane 100 is stopped) (S306). In a case where the key switch is not turned off (S306/NO), the process returns to S301. On the other hand, in a case where the key switch is turned off (S306/YES), the controller 18 writes the set value of the brake control characteristic in the RAM (S307).

In Modification Example 1-3, by turning off the key switch, the current work mode (heavy excavation mode or light excavation mode) is written in the RAM and the process is ended. Thus, when the next key switch is turned on (that is, the operation of the crane 100 is started), the work mode previously stored in S301 can be read as an initial value. That is, the previous work mode can be automatically restored. Therefore, by virtue of the control of the brake device 4 according to Modification Example 3, the usability is much more excellent for the operator.

Another Embodiment

Figure 8:
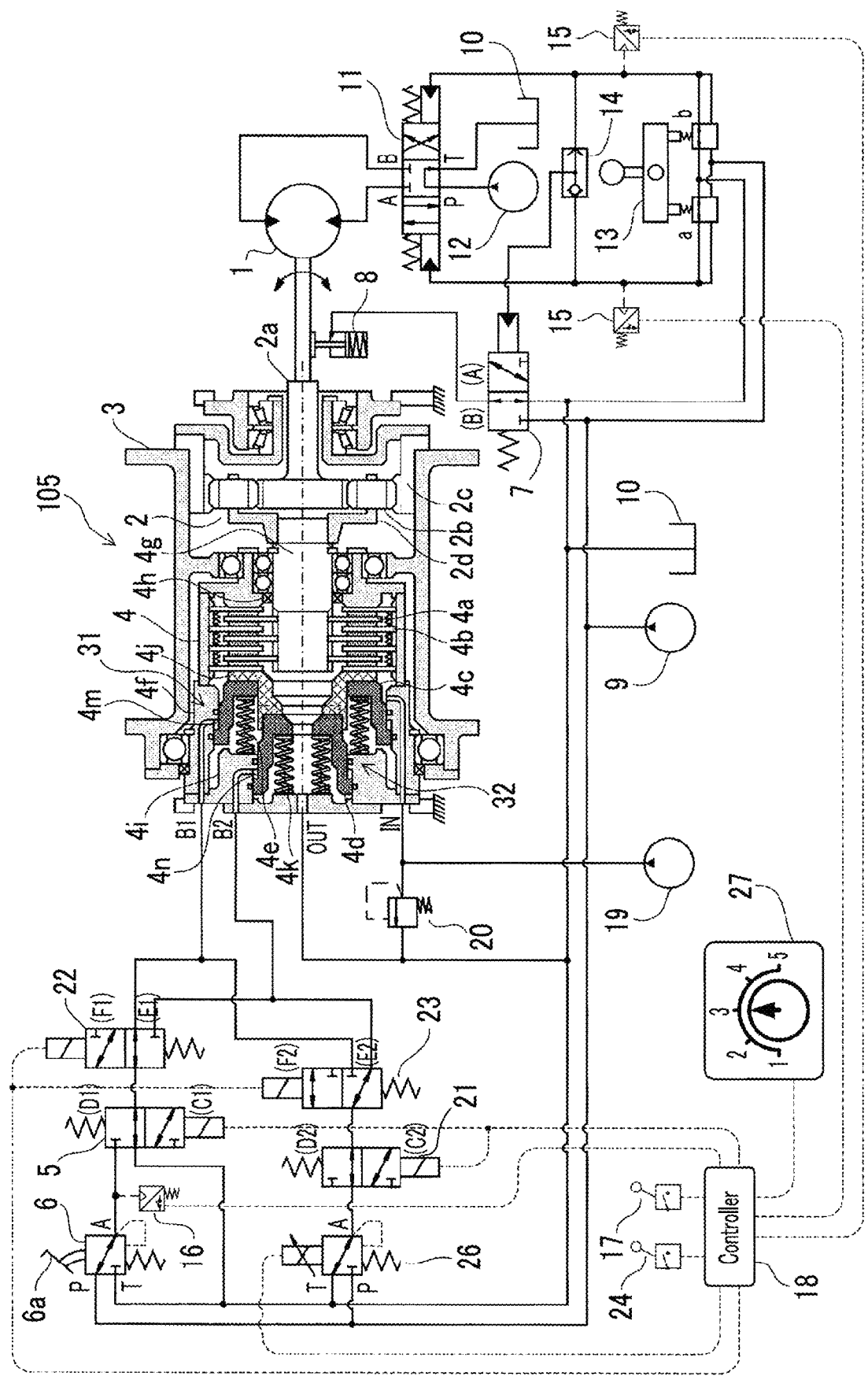
FIG. 8 is a hydraulic circuit diagram of a brake device according to another embodiment.

FIG. 8 is a hydraulic circuit diagram of the brake device 4 according to another embodiment. The difference of the other embodiment shown in FIG. 8 from the one embodiment is that an electromagnetic proportional pressure-reducing valve (hereinafter referred to as an electromagnetic proportional valve) 26 is provided on the upstream side of the brake mode switching valve 21 and a brake control characteristic adjustment dial 27 is connected to the controller 18. According to this configuration, since the pressure oil of which the pressure is adjusted by the brake control valve 6 and the pressure oil of which the pressure is adjusted by the electromagnetic proportional valve 26 are selectively supplied to the first pressure chamber 4m and the second pressure chamber 4n, the brake control characteristics can be more finely changed. Hereinafter, the features of the brake control characteristics in the other embodiment will be specifically described.

FIG. 9A is a diagram showing control characteristics of the electromagnetic proportional valve, FIG. 9B is a diagram showing brake control characteristics in the heavy excavation mode, and FIG. 9C is a diagram showing brake control characteristics in the light excavation mode. In addition, in FIGS. 9A, 9B, and 9C, the control characteristics when the brake control characteristic adjustment dial 27 is set to Level 3 are shown by thick lines, and the control characteristics at Levels 1, 2, 4, and 5 are shown by thin lines. Additionally, the control characteristic for the respective levels of the electromagnetic proportional valve 26 shown in FIG. 9A are stored in a look-up table format in the storage device of the controller 18.

In addition, FIG. 9A defines the characteristics of the control pressure of the electromagnetic proportional valve 26 with respect to the pressure of the brake control valve 6. However, instead of the pressure of the brake control valve 6, the stepping amount (stroke) and the stepping force of the brake pedal 6a or the relationship between the rotational speed of the hoisting winch 105 and the characteristics of the control pressure of the electromagnetic proportional valve 26 may be defined. That is, the electromagnetic proportional valve 26 may be configured to be operated by the controller 18 on the basis of a control signal according to the brake manipulation.

As shown in FIG. 9A, the control characteristic of the electromagnetic proportional valve 26 when set to Level 1 is a characteristic in which the control pressure of the electromagnetic proportional valve 26 increases linearly from 0% to 100% depending on an increase in pressure in a range where the pressure of the brake control valve 6 is 0% or more and less than 20% and the control pressure of the electromagnetic proportional valve 26 is maintained at 100% in a range where the pressure of the brake control valve 6 is 20% or more and 100% or less.

The control characteristic of the electromagnetic proportional valve 26 when set to Level 2 is a characteristic in which the control pressure of the electromagnetic proportional valve 26 increases linearly from 0% to 100% depending on an increase in pressure in a range where the pressure of the brake control valve 6 is 0% or more and less than 40% and the control pressure of the electromagnetic proportional valve 26 is maintained at 100% in a range where the pressure of the brake control valve 6 is 40% or more and 100% or less.

The control characteristic of the electromagnetic proportional valve 26 when set to Level 3 is a characteristic in which the control pressure of the electromagnetic proportional valve 26 linearly increases from 0% to 100% depending on an increase in pressure in a range where the pressure of the brake control valve 6 is 0% or more and less than 60% and the control pressure of the electromagnetic proportional valve 26 is maintained at 100% in a range where the pressure of the brake control valve 6 is 60% or more and 100% or less.

The control characteristic of the electromagnetic proportional valve 26 when set to Level 4 is a characteristic in which the control pressure of the electromagnetic proportional valve 26 increases linearly from 0% to 100% depending on an increase in pressure in a range where the pressure of the brake control valve 6 is 0% or more and less than 80% and the control pressure of the electromagnetic proportional valve 26 is maintained at 100% in a range where the pressure of the brake control valve 6 is 80% or more and 100% or less.

The control characteristic of the electromagnetic proportional valve 26 when set to Level 5 is a characteristic in which the control pressure of the electromagnetic proportional valve 26 increases linearly from 0% to 100% depending on an increase in pressure in a range where the pressure of the brake control valve 6 is 0% or more and 100% or less.

In this way, since the pressure of the electromagnetic proportional valve 26 is controlled in accordance with the control characteristics shown in FIG. 9A, the brake control characteristics shown in FIG. 9B are obtained in the heavy excavation mode, and the brake control characteristics shown in FIG. 9C are obtained in the light excavation mode.

For example, in a case where the set value of the brake control characteristic adjustment dial 27 is Level 3, in the heavy excavation mode, as shown in FIG. 9B, the braking force increases linearly with the same inclination as the characteristic of the first piston 4c alone with an increase in the pedal stroke in a range where the pedal stroke is in a range of 0% or more and less than 40%, and the assist characteristic of the second piston 4*d* is added in a range where the pedal stroke is 40% or more and 100 or less, so that a brake control characteristic is obtained in which the braking force increases linearly with a steeper inclination than the characteristic of the first piston 4*c* alone.

Additionally, as shown in FIG. 9C, in the light excavation mode, even in a case where the set value is the same Level 3, the braking force increases linearly with the same inclination as the characteristic of the second piston 4*d* alone with an increase in the pedal stroke in a range where the pedal stroke is in a range of 0% or more and less than 40%, and the assist characteristic of the first piston 4*c* is added in a range where the pedal stroke is 40% or more and 100 or less, so that a brake control characteristic is obtained in which the braking force increases linearly with a steeper inclination than the characteristic of the second piston 4*d* alone.

Also, even at the same Level 3, the heavy excavation mode has a gentler inclination of a straight line than the light excavation mode in a range where the pedal stroke is 0% or more and less than 40% and has a steeper inclination of a straight line in a range where the pedal stroke is 40% or more and 100 or less.

In this way, in the other embodiment, more detailed brake control characteristics can be realized. Therefore, the usability is much more excellent for the operator. In particular, the other embodiment is suitable for the work of switching between the heavy excavation mode and the light excavation mode.

Specifically, one crane 100 is usually mounted with two or three winch devices. For this reason, there is a case where the load form of each winch device is different depending on the work contents. For example, in clamshell work, a winch device that supports a bucket and controls the lifting and lowering of the bucket and a winch device that controls the opening and closing of the bucket are used.

During excavation, in the manipulation of landing by freefall manipulation in a state where the bucket is open (released state), the falling speed is adjusted by the winch device for supporting the bucket, which is a heavy load, and the winch device for opening and closing the bucket, which is a light load, executes the manipulation of closing the bucket by following the falling speed of the supporting winch device. Here, there is a concern that when the follow-up is delayed, the bucket closes and then lands, while when the follow-up precedes, the wire rope of the opening and closing winch device may loosen and cause random winding. For this reason, in the clamshell work, high operability is required particularly for the winch device for opening and closing the bucket.

In this way, in a case where the load is different for each winch device and specialization is desired according to each load form, the other embodiment is effective.

In addition, the brake control characteristic adjustment dial 27 is set to five steps of Levels 1 to 5, but this setting is optional. Additionally, a continuously variable dial having an intermediate value of 1 to 5 Steps may be used.

Modification Example 2-1

Additionally, the control characteristics of the electromagnetic proportional valve 26 according to the other embodiment may be modified so as to be curvedly controlled.

FIG. 10A is a diagram showing control characteristics of the electromagnetic proportional valve, FIG. 10B is a diagram showing brake control characteristics in the heavy excavation mode, and FIG. 10C is a diagram showing brake control characteristics in the light excavation mode. As shown in FIG. 10A, the control characteristic of the electromagnetic proportional valve 26 when set to Level 1 is a characteristic in which the control pressure of the electromagnetic proportional valve 26 increases curvedly from 0% to 100% depending on an increase in pressure in a range where the pressure of the brake control valve 6 is 0% or more and less than 20% and the control pressure of the electromagnetic proportional valve 26 is maintained at 100% in a range where the pressure of the brake control valve 6 is 20% or more and 100% or less. As shown in the figure, Levels 2 to 5 also have a control characteristic in which the control pressure of the electromagnetic proportional valve 26 increased curvedly with an increase in the pressure of the brake control valve 6.

In this way, since the pressure of the electromagnetic proportional valve 26 is controlled in accordance with the control characteristics shown in FIG. 10A, the brake control characteristics shown in FIG. 10B are obtained in the heavy excavation mode, and the brake control characteristics shown in FIG. 10C are obtained in the light excavation mode.

For example, in a case where the set value of the brake control characteristic adjustment dial 27 is Level 3, in the heavy excavation mode, as shown in FIG. 10B, the braking force increases linearly with the same inclination as the characteristic of the first piston 4*c* alone with an increase in the pedal stroke in a range where the pedal stroke is in a range of 0% or more and less than 40%, and the assist characteristic of the second piston 4*d* is added in a range where the pedal stroke is 40% or more and 100 or less, so that a brake control characteristic is obtained in which the braking force increased curvedly with an increase in the pedal stroke. Additionally, even in the light excavation mode, the brake control characteristics as shown in FIG. 10C can be obtained.

Modification Example 2-1 is suitable because it is possible to realize the operability that matches the operator's feeling in a case where the braking energy accompanied by the freefall changes in a quadratic curve due to gravitational acceleration. Moreover, when the other embodiment and Modification Example 2-1 are configured to be selectable by the operator, higher functionality is achieved.

In addition, the present invention is not limited to the aforementioned embodiment, and various modifications can be made without departing from the concept of the present invention, and all technical matters included in the technical idea described in the claims are included are the subject of the present invention. Although the above-mentioned embodiment shows a preferred example, those skilled in the art can realize various alternatives, alternations, modifications, or improvements from the contents disclosed in the present specification. These are included in the technical concept described in the appended claims.

In each of the above-described embodiments, the negative type brake device 4 is exemplified, but a positive type brake device may be used. That is, in the present invention, the brake device is not limited to the negative type.

Additionally, a crawler crane has been exemplified as an example of the crane. However, the present invention is not limited to this and can be applied to all kinds of cranes such as tower cranes, ceiling cranes, jib cranes, retractable cranes, stacker cranes, portal cranes, unloaders, and other basic machines such as earth drills, in addition to other mobile cranes such as wheel cranes, truck cranes, rough terrain cranes, and all terrain cranes. Additionally, the present invention can be applied to work machines other than cranes, for example, road machines, hydraulic excavators, wheel loaders, and the like. Additionally, the brake device of the present invention can be applied to other than winches.

It should be understood that the invention is not limited to the above-described embodiment, but may be modified into various forms on the basis of the spirit of the invention. Additionally, the modifications are included in the scope of the invention.

What is claimed is:

1. A winch brake device that is used for a work machine and generates a braking force on the basis of a brake manipulation, the winch brake device comprising:
    a pressing member that brings braking members into pressure contact with each other to generate the braking force;
    a first brake cylinder including a first piston that is configured separately from the pressing member and is capable of pressing the pressing member, the first brake cylinder being configured to apply a first pressing force for bringing the braking members into pressure contact with each other to the pressing member via the first piston; and
    a second brake cylinder including a second piston that is configured separately from the pressing member and is capable of pressing the pressing member independently of the first piston, the second brake cylinder being configured to apply a second pressing force different from the first pressing force to the pressing member via the second piston,
    wherein the first brake cylinder and the second brake cylinder are capable of applying the first pressing force or the second pressing force independently of each other.

2. The winch brake device according to claim 1, wherein the first brake cylinder and the second brake cylinder are capable of cooperating with each other to apply the first pressing force and the second pressing force.

3. The winch brake device according to claim 1, wherein the first brake cylinder includes a first pressure chamber to which a pressure oil is supplied,
    the second brake cylinder includes a second pressure chamber to which the pressure oil is supplied,
    one of the pressure oil of a maximum pressure and the pressure oil of which a pressure is adjusted depending on the brake manipulation is selectively supplied to one of the first pressure chamber and the second pressure chamber, and
    the other of the pressure oil of the maximum pressure and the pressure oil of which the pressure is adjusted depending on the brake manipulation is selectively supplied to the other of the first pressure chamber and the second pressure chamber.

4. The winch brake device according to claim 1, further comprising:
    a brake control valve that operates depending on the brake manipulation; and
    an electromagnetic proportional valve that operates on the basis of an input signal,
    wherein the first brake cylinder includes a first pressure chamber to which a pressure oil is supplied,
    the second brake cylinder includes a second pressure chamber to which the pressure oil is supplied,
    the pressure oil of which a pressure is adjusted by the brake control valve is supplied to one of the first pressure chamber and the second pressure chamber, and
    the pressure oil of which a pressure is adjusted by the electromagnetic proportional valve is supplied to the other of the first pressure chamber and the second pressure chamber.

5. The winch brake device according to claim 4, wherein a plurality of control characteristics of the electromagnetic proportional valve are set in advance, and
    the electromagnetic proportional valve operates on the basis of the input signal corresponding to the control characteristic selected by an operator.

6. The winch brake device according to claim 4, wherein the pressure oil supplied to the first pressure chamber and the pressure oil supplied to the second pressure chamber are supplied via the brake control valve that is common.

7. The winch brake device according to claim 1, wherein the work machine is a crane capable of performing freefall work in which a suspended cargo is dropped by its own weight,
    a first work mode in which work is performed by generating a braking force caused by the first brake cylinder and a second work mode in which work is performed by generating a braking force caused by the second brake cylinder are set in advance in the crane, as work modes in the freefall work, and
    switching of the work modes is disabled during the freefall work.

8. The winch brake device according to claim 1, wherein the work machine is a crane capable of performing freefall work in which a suspended cargo is dropped by its own weight,
    a first work mode in which work is performed by generating a braking force caused by the first brake cylinder and a second work mode in which work is performed by generating a braking force caused by the second brake cylinder are set in advance in the crane, as work modes in the freefall work, and
    switching between the first work mode and the second work mode is automatically performed on the basis of a load of the suspended cargo.

9. The winch brake device according to claim 1, wherein the first brake cylinder applies the first pressing force to the pressing member by an urging force of a first spring,
    the second brake cylinder applies the second pressing force to the pressing member by an urging force of a second spring, and
    the first spring and the second spring include the same spring characteristic and are different in number from each other.

10. The winch brake device according to claim 1, wherein the first brake cylinder includes a first pressure chamber to which a pressure oil is supplied,
    the second brake cylinder includes a second pressure chamber to which the pressure oil is supplied, and
    the pressure oil of which a pressure is adjusted depending on the brake manipulation is supplied to one of the first pressure chamber and the second pressure chamber.

* * * * *